United States Patent Office 3,438,895
Patented Apr. 15, 1969

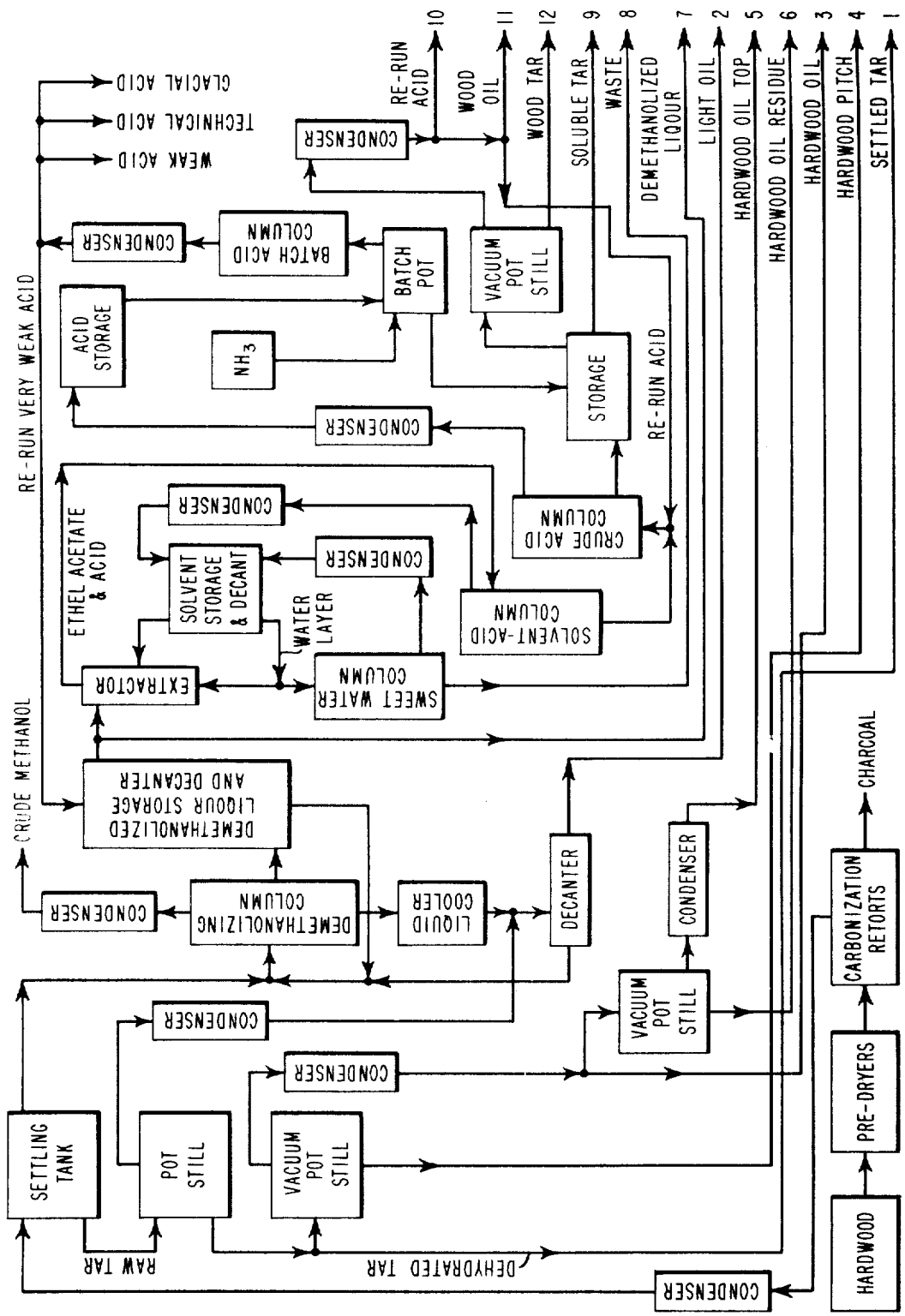

3,438,895
DRILLING MUD AND PRODUCT THEREFOR
George B. Alcorn and Frank D. Edmonsond, Crossett, Ark., assignors by mesne assignments, to Georgia-Pacific Corporation, Portland, Oreg., a corporation of Georgia
Continuation-in-part of applications Ser. No. 234,442, Oct. 31, 1962, and Ser. No. 258,297, Feb. 13, 1963. This application July 30, 1965, Ser. No. 478,025
Int. Cl. C10m 7/16; E21b 43/16
U.S. Cl. 252—8.5     19 Claims

ABSTRACT OF THE DISCLOSURE

A water base fluid useful in oil well drilling and water flooding. The drilling fluid or water flooding medium contains as an essential component the reaction product of an alkali metal alkali or ammonia alkali with an organic fraction of the pyroligneous liquor obtained from the destructive distillation of ligneous material, which component functions to inhibit clay or shale hydration. In drilling fluids the alkali-pyroligneous acid fraction reaction product also functions to reduce viscosity.

---

This application is a continuation-in-part of our pending applications Ser. No. 234,442, filed on Oct. 31, 1962 and Ser. No. 258,297, filed Feb. 13, 1963, both now abandoned.

This invention relates to the drilling of oil and gas wells and pertains more specifically to conditioners for improving drilling fluids, to drilling fluids containing such conditioners and to methods for making the improved conditioners.

In general, all drilling fluids useful in the rotary drilling of oil and gas wells are termed "drilling muds." The drilling mud has several functions:

(1) The preliminary function is to remove the bit cuttings from the hole. The ability of the mud to perform this function depends in turn on a number of properties including the viscosity and gelation properties of the mud.

(2) To provide back pressure so as to keep flows of salt water or similar materials out of the hole and also to prevent the uncontrollable flow of oil or gas. The ability of the mud to perform this function is determined by the weight of the mud, generally measured in terms of lbs./gal.

(3) To prevent contamination of surrounding formations. This property of the mud is measured as fluid loss and is believed to be largely dependent upon the ability of the mud to provide a suitable filter cake lining the hole.

(4) To cool the bit and to lubricate the drill string, and (5) To prevent caving in of the hole as from sand, gravel, shale, etc.

A suitable drilling mud is formulated by a mud engineer, a man skilled in this art, by suitable blending of clays, weighting materials, chemicals, water and oil. The types and quantities of each of these materials necessary to achieve the desired result will depend on the particular job to be done, the problems varying from day to day as different formations are penetrated. This, in turn, leads to day to day changes in the treatment of the drilling mud.

While it is evident that different muds are desirable for different locations and different problems, in general, a low-solids mud is preferred to a high-solids mud, in that, inter alia, it permits substantially faster penetration rates. As a principal cost of drilling is the cost of the drilling rig which is charged on a time basis, it is evident that a significant improvement in drilling rate results in substantially lower overall drilling costs. Unfortunately, it is difficult to maintain a low-solids mud.

To obtain the desired flow properties of a mud, it is necessary to add chemicals to the mud to provide the desired low viscosity and gel properties. The chemicals used for this treatment are termed "dispersants" or "thinners." The most commonly used thinners are prepared from lignosulfonates (obtained from the treatment of wood pulp with a bisulfite), tannin materials and lignite products. Such organic compounds are further modified by treatment with alkalis and generally by further treatment with a polyvalent metal ion-containing compound (to provide ions of calcium, chromium, iron, aluminum, etc.) providing a thinner or dispersant capable of imparting the desired properties to a drilling mud. Other thinning agents such as polyphosphates, non-ionic detergents, tall oil soaps, etc., are also used in limited areas.

In drilling the well, a reservoir of mud, termed a "pit" is established adjacent to the drilling rig. The mud is then circulated as the drilling progresses from the pit into the hole then out of the hole through a shaker screen to a small settling pit back to the reservoir pit to establish a closed circulation loop. The purpose of the shaker screen is to retain the drilled cuttings from the hole which have been suspended in the mud. Finer aggregates settle out in the settling pit. However, many of the drilled cuttings are too finely divided to be retained on the screen or to separate in the settling pit so that as drilling progresses the solids content of the mud increases due to the inclusion in the mud of such solids as contaminants along with the desired materials.

Such contamination of the mud by natural clays is particularly troublesome when drilling through a bentonitic heaving shale. Such shale has long constituted one of the most difficult drilling problems which still remains to be satisfactorily solved. As the water in the mud is absorbed by such shales, the shales swell, causing the side of the wall containing such shale to break off and fall into the hole, thus adding significantly to the mud volume, far over and above the volume which would be produced by action of the cutting bit alone. In addition, the swelling action following on absorption of the water leads to the formation of a colloidal dispersion of the shale difficult to remove from the resulting contaminated mud. The thinners commonly used in the drilling mud industry, that is the various lignosulfonates, tannins, and lignite materials, are highly efficient thinners and dispersants, having significant surface-active properties. As a result, these materials tend to form relatively stable dispersions of such bentonitic shale particles in the mud. Thus, such shale formations, when encountered in normal drilling practice, require relatively expensive precautions in using the normal medium to high-solids mud (as by centrifuging to differentially separate the desired from the undesired solids), while making a low-solids mud all but impossible for economical operation.

Accordingly, it is an object of the present invention to provide a novel class of drilling mud thinners.

Another object of the invention is to provide a group of drilling mud thinners which are extremely inhibitive of bentonitic shale.

Yet again an object of the invention is to provide a practicable means of maintaining a low-solids drilling mud.

A further object of the invention is to provide a novel group of compounds having unusual and unobvious properties.

Still another object of the invention is to provide a drilling mud characterized by excellent flow properties and permitting high penetration rates.

These and other objects of the invention will become apparent in the following description of the invention wherein the figure shows a flow chart for the production of the intermediate materials used in preparing the compounds useful in the instant invention.

It has now been found that the reaction product of an alkali with one or more fractions obtained from the destructive distillation of ligneous materials makes possible the preparation of drilling fluids characterized by excellent flow properties, combined with high inhibition for bentonitic shales. Such ligneous materials include, for example, softwoods, such as pine, fir, spruce, etc.; hardwoods such as oak, beech, gum, maple, etc.; and coals such as anthracite coal, bituminous coal and lignite.

The destructive distillation of wood has long been practiced to obtain a variety of products, including principally charcoal, acetic acid and methanol. In the course of such destructive distillation, a number of tars and oils are obtained in the pyroligneous liquor which heretofore have had little commercial utility. Such tars and oils are complicated chemical mixtures containing, in each case, significant amounts of materials whose precise chemical structure is unknown. It has now been found that when such tars or oils are reacted with an alkali, that the resulting products, by themselves or in combination, constitute a class of superior additives for use in drilling muds.

Coal, being the result of various geological processes acting on wood and other vegetable matter, is chemically related to wood. Coal has long been subjected to destructive distillation to produce coke. The pyroligneous liquor produced by this process includes various fractions, some of which correspond in some respects to certain fractions obtained from wood pyroligneous liquor. In particular, coal tar creosote comprises a fraction rich in phenolic compounds of varying complexity which is generally analogous to the wood oil obtained from wood pyroligneous liquor. The coal tar creosote may also be reacted with an alkali to constitute a superior additive for use in drilling muds. Coal tar creosote is commercially available from a variety of sources being used, inter alia, to impregnate wood, etc.

Of the various types of ligneous materials which may be subjected to destructive distillation, hardwoods are preferred. Accordingly, the process for the destructive distillation of wood will be illustrated with reference to hardwoods, it being understood that the process is equally applicable to the destructive distillation of pine and other softwoods. The process can best be understood by reference to the drawing.

The vapor from the carbonization of the hardwood is condensed in a settling tank to produce an aqueous liquor and a water-insoluble layer. The water-insoluble material is termed the "settled tar" and is taken from the process at 1. It is common practice to subject such "settled tar" to an atmospheric distillation to produce a hardwood oil termed "light oil" having a specific gravity less than that of water. After the "light oil" has been removed at 2, the tar is subjected to a vacuum distillation to produce a hardwood oil having a distillation range of up to 350° C. and is taken from the process at 3. This hardwood oil consists of a great variety of chemical materials and generally is rich in pyrogallol and pyrogallol ethers. The residue from this distillation, termed "hardwood pitch," contains a considerable quantity of high boiling phenolic materials of unknown constitution and is taken from the process at 4. The hardwood oil in turn may be fractionated to provide a hardwood oil top having a boiling point up to 200° C. and taken from the process at 5, and a hardwood oil residue taken from the process at 6.

The water-soluble layer of the pyroligneous liquor in the settling tank is processed to remove first crude methanol, then water which is passed to waste, and then crude acetic acid. The demethanolized pyroligneous liquor is taken from the process at 7, while the waste water is removed at 8. The residue from the distillation of crude acetic acid, termed the "soluble tar" because of its solubility in the aqueous acetic acid solution has a complex chemical mixture and is composed of a mixture of lower aliphatic acids, phenols, lactones and ketones. The soluble tar is obtained in the process at 9. The product produced by alkalizing the soluble tar constitutes a premium material in formulating drilling muds in accordance with the instant invention. While it is preferred to utilize the entire soluble tar fraction, it is also within the scope of the invention to further fractionate the soluble tar fraction into separate fractions which may be alkalized and used in preparing drilling muds. Thus, the soluble tar may be subjected to vacuum distillation to produce a first fraction characterized by a lower boiling, highly acidic fraction containing a large amount of the lower aliphatic acids, a higher boiling, less acidic fraction, and a tarry still bottom. The extent of the first cut in the distillation may be determined by temperature, but in plant practice is determined by acidity, the first cut being terminated when the acidity of the fraction falls to 30 g./100 ml. calculated as acetic acid as determined by titration with 0.5 N sodium hydroxide to a phenolphthalein end point. This cut termed the "rerun" acid is recycled for removal of acetic acid which is still present as a significant residue in the soluble tar or may be removed at 10. The remaining portion of the distillate, termed "wood oil," is taken from the process as 11, while the still bottoms are termed "wood tar" and are taken from the process at 12.

The various fractions of the pyroligneous liquor (whether obtained from hardwood, softwood or coal tar creosote) are alkalized by reacting the desired fraction directly with the alkali. The alkali may be an ammonium or alkali metal hydroxide, oxide or carbonate as known to those skilled in the art. In the case of ammonia, the ammonia gas itself may be used as the direct alkalizing agent. Potassium hydroxide and ammonium hydroxide are the preferred alkalis in preparing the products of the invention. The reaction may be carried out by mixing the alkali with the pyroligneous fraction in a muller or other reaction vessel. If desired, the alkali may be dissolved in a small amount of water and the aqueous alkali solution contacted with the pyroligneous fraction. Mixtures of alkalis may also be used. The "light oil" may be alkalized by mixing with aqueous alkali solution allowing the mixture to settle into two layers, an aqueous layer and an oily layer, and removing the oily layer. The alkalization reactions are exothermic, but not so strongly exothermic that special cooling means are needed. Normally, the temperature in the reactor will rise to about 100° C. if no positive cooling means are used. This will vary somewhat, depending principally on the particular fraction of the pyroligneous material used. As used herein, by "fraction of pyroligneous liquor" is meant any fraction derived from the destructive distillation of wood or coal which itself is either water-insoluble or only slightly water-soluble, but which reacts with alkali to yield a product having high water solubility.

If desired, the products may be further modified to enhance their hydrophilic character as by treatment with formaldehyde, a bisulfite, ethylene oxide, etc. The ratio of alkali to pyroligneous material should be such as to provide a product having a pH of at least about 7. Preferably the resulting product will have a pH of from about 9 to 11.5 and generally in the neighborhood of 10.

All potassium and ammonium salts of the pyroligneous liquor fractions combine dispersing properties with high inhibition of bentonitic shales. Salts of the pyroligneous liquor fractions with alkalis other than potassium or ammonia have excellent thinning and dispersing properties in drilling muds, but in some cases, do not have a strong inhibition on the hydration of bentonitic shales. Accordingly, it is preferred to use the potassium and ammonium salts of the various pyroligneous liquor fractions, or mixtures thereof with each other or with other alkali salts as a mixed ammonium-sodium salt of the various pyroligneous liquor fractions. The ammonium salts are most preferred.

While the settled tar fraction of the pyroligneous liquor has previously been used in various processes, heretofore the soluble tar fraction has merely been processed to remove the separate chemicals, as methanol and acetic acid, and then burned or otherwise destroyed. In the instant it has been found, however, that the product obtained by alkalizing the soluble tar or a fraction thereof as herein set forth, is particularly useful in formulating drilling muds which are particularly useful in bentonitic shale formations. The products so obtained may be used in a variety of ways in formulating drilling muds as will be apparent to those skilled in the art. Thus, the alkalized pyroligneous liquor fractions may be used as a secondary additive in known drilling mud formulations such as a gyp mud, a low pH chrome lignosulfonate mud, a surfactant mud, etc., to inhibit bentonitic shale.

While the alkalized pyroligneous fractions may be utilized in this manner, it is preferred to use such materials as the primary thinner or dispersant in a low-solids drilling fluid. When so used, other materials will, of course, normally be present in such a fluid. Thus, barite or other weighting agents are used to obtain the desired weight; oil or any of the various proprietary items known for this use may be emulsified in the fluid to assist in lubricating the drill stem; and a water loss control agent may be added to control the fluid loss of the mud. In conventional drilling mud formations, bentonite clays are added to the mud, often in considerable quantities, to assist in forming a filter cake on the walls of the hole to thus assist in controlling fluid loss. So inhibitive toward bentonite are the materials of the invention that when used as the primary dispersant, the effectiveness of the bentonite clays in inhibit water loss is considerably reduced. Accordingly, in such fluids other proprietary water loss control agents should be used such as starch, sodium carboxymethyl cellulose, polyacrylates, guar gum, etc. These materials also impart viscosity-building properties to the mud which can aid in the removal of cuttings from the hole. While such materials as those listed will normally be used in the preferred drilling mud compositions of the invention, it is understood that other materials may be added to specific muds, depending on the formation being drilled and the problems being solved. Thus loss circulation materials may be added, other dispersants or thinners may be added as a secondary thinner or dispersant (such secondary thinners including chrome lignosulfonate, quebracho, lignite, etc.), as well as other materials customarily used in drilling muds such as corrosion inhibitors, salt, extreme pressure lubricants, bactericides, defoamers and caustic. Additional caustic is particularly desirable in such muds if heavy concentrations of polyvalent ions (as calcium) contaminate the fluid.

To demonstrate the utility of the invention, the following examples show the use of the various alkalized pyroligneous fractions to inhibit a bentonite mud. The base mud used in each test was prepared by dispersing 24.4 lbs. of high yield bentonite in a barrel of water containing the material to be tested. The alkalized fractions of the pyroligneous liquor in each example were prepared by reacting the designated fraction with sufficient alkali to give a product having a pH of about 10. The alkali used was potassium hydroxide, unless otherwise noted. Thus, where ammonium hydroxide was used, "NH$_4$" is noted, and where sodium hydroxide was used, "Na" is noted.

Examples 1 through 25

Twenty-five samples of the base mud prepared as above were formulated, one sample being used as a control, the other twenty-four each contained 10 lbs. of a chemical thinning agent as set forth in Table I. The muds so produced were tested for apparent viscosity (AV), plastic viscosity (PV), yield point (YP), initial gel, 10 minute gel and water loss. The apparent viscosity, plastic viscosity, yield point, initial gel and 10 minute gel were all determined in a Fann viscometer in accordance with standard drilling mud practice, while the water loss was measured by the standard A.P.I. procedure. In addition, the time for formation of a clay-free layer one sixteenth of an inch thick was measured as follows: ten pounds per barrel of the material to be tested for hydration inhibition was mixed in distilled water for ten minutes at 5000 r.p.m. using a Hamilton Beach drink mixer. At this time 24.4 pounds per barrel of bentonite clay was added and mixed at 5000 r.p.m. for 30 minutes. The sample was immediately poured into a 250 ml. graduated cylinder to a depth of 10 inches. Minutes required to produce a clay-free layer of 1/16 inch depth was timed by use of a stopwatch. The results of this test are set forth in Table I.

TABLE I

| Example | | AV | PV | XP | Init. gel | 10 min. gel | Water loss (ml.) | Clay-free layer |
|---|---|---|---|---|---|---|---|---|
| 1 | Base mud | 17 | 9 | 16 | 16 | 33 | 13.4 | 0/24 hr. |
| 2 | Ferrochrome lignosulfonate #1 | 3.5 | 3.5 | 0 | 1 | 1.5 | 6.4 | 0/24 hr. |
| 3 | Ferrochrome lignosulfonate #2 | 3.5 | 3 | 1 | 0.5 | 1 | 9.1 | 0/24 hr. |
| 4 | Chrome lignosulfonate | 5 | 4 | 2 | 1 | 3 | 12.2 | |
| 5 | Bark Extract | 2.75 | 2.5 | 0.5 | 0.5 | 0.5 | 7.4 | 107 min. |
| 6 | Lignite reaction product | 8.25 | 7.5 | 1.5 | 1.0 | 2.0 | 8.0 | 110 min. |
| 7 | Settled tar | 2.88 | 2.5 | 1.25 | 0.5 | 1 | 19.2 | 2 min. |
| 8 | Hardwood oil | 3.75 | 3.0 | 1.5 | 1.0 | 1.5 | 142 | 4.5 min. |
| 9 | Hardwood pitch | 4.38 | 3.0 | 2.75 | 1.5 | 3 | 34.4 | 17 hr. |
| 10 | Hardwood oil top | 3.75 | 3.0 | 1.5 | 1.0 | 1.5 | 122.2 | 2.5 min. |
| 11 | Hardwood oil residue | 3.5 | 3.0 | 1.0 | 1.0 | 1.0 | 140 | 2 min. |
| 12 | Wood tar | 5.75 | 3.5 | 4.5 | 3.5 | 7 | 18.6 | 4 min. |
| 13 | Blend of wood oil and wood tar | 4 | 3 | 2 | 1.5 | 1.5 | 19 | 4.5 min. |
| 14 | Light oil | 4.25 | 3.0 | 2.5 | 2.0 | 2.0 | | 2.25 min. |
| 15 | Coal tar creosote | 4 | 3 | 2 | 2 | 2 | | 3. |
| 16 | Settled tar (Pine) | 3 | 2 | 2 | 1 | 1.5 | | 3. |
| 17 | Pyroligneous acid (Pine) | 4.75 | 3 | 2.5 | 2 | 3 | | 2. |
| 18 | Wood oil | 4.25 | 3.0 | 2.5 | 1.0 | 1.5 | 178.2 | 5.5 min. |
| 19 | Wood oil, Na | 5.13 | 3.75 | 2.75 | 2 | 6 | | 0/24 hr. |
| 20 | Soluble tar | 2.88 | 2.5 | 0.75 | 0.5 | 1.0 | 39.6 | 3 min. |
| 21 | Soluble tar, Na | 3.38 | 2.75 | 1.25 | 1 | 1 | | 10. |
| 22 | Demethanolized liquor, NH$_4$ | 3.25 | 3.0 | 0.5 | 0.5 | 0.5 | | |
| 23 | Demethanolized liquor | 3.75 | 2.5 | 2.5 | 1.0 | 1.5 | | |
| 24 | Rerun acid, NH$_4$ | 3.0 | 2.5 | 1.0 | 1.0 | 1.0 | | |
| 25 | Rerun acid | 3.5 | 3.0 | 1.0 | 1.0 | 1.0 | | |

The ferrochrome lignosulfonate #1 is a commercial ferrochrome lignosulfonate available under the tradename "Q-Broxin." The ferrochrome lignosulfonate #2 is a commercial ferrochrome lignosulfonate available under the tradename "Spersene." The chrome lignosulfonate is a commercial chrome lignosulfonate available under the tradename "Unical." The bark extract is a commercial dispersant available under the tradename "Milflo" and the lignite reaction product is a commercial lignite material available under the tradename "XP-20."

As can be seen, the alkalized product prepared from hardwood pitch is less desirable as a shale inhibitor in drilling muds than the other products of the invention, although such product is equally useful as a general thinner. It is highly unusual and unexpected that combinations of the alkalized hardwood pitch with other alkalized fractions of the pyroligneous liquor result in products combining the excellent shale inhibiting properties of the other fraction, together with even lower water loss than would be obtained from either fraction by itself. Thus, as shown in Example 9, the hardwood pitch itself has a water loss of about 34 ml., while the hardwood oil has a water loss of 142, but combined as in the settled tar, they give a water loss of less than either one by itself, namely of 19 ml.

Examples 26–44

To illustrate the relative inhibiting effect of the alkali salts of the pyroligneous liquor fractions on bentonitic shale, the depth of the clay-free layer was measured as indicated in the last column of Examples 1 through 25 as a function of time. The results of these tests are set forth in Table II, wherein the last column gives the depth of the clay-free layer after 24 hours and the remaining columns give the number of minutes observed in forming a clay-free layer of the depth indicated at the top of the column:

are difficult to ascertain in that drilling muds are normally treated on a regular daily basis to maintain the desired properties in the fluid. If it is considered that all of the additive placed in the mud is retained therein, under some circumstances it would appear that extremely high concentrations of additive are present. Under field conditions, however, it is considered that there is a significant depletion of the additive either by leakage to the formations or by means of reaction with the clays or other materials present in the mud. These factors make it difficult to set a definite upper limit on the concentration of additive in the drilling fluid. In general, it is drilling mud practice to treat the desired physical properties in the mud rather than any theoretical concentration of additive. Under normal drilling practices, concentration of more than about 25 lbs. per barrel are economically undesirable. Where the products of the invention are used as supplementary additives to a mud, employing another material, as a chrome lignosulfonate, as primary thinner, generally lower concentrations of the products of the invention will be used than where the instant products are the sole or primary thinner. When the alkalized pyroligneous liquor fraction is added to the mud before hydratable shales have severely contaminated the drilling fluid,

TABLE II

| Example | | Inches | | | | | | Inches at 24 hrs. |
|---|---|---|---|---|---|---|---|---|
| | | ¼ | ½ | 1 | 2 | 3 | 4 | |
| 26 | Base mud | | | | | | | 0 |
| 27 | Ferrochrome lignosulfonate #1 | | | | | | | 0 |
| 28 | Ferrochrome lignosulfonate #2 | | | | | | | 0 |
| 29 | Chrome lignosulfonate | | | | | | | 0 |
| 30 | Bark Extract | | | | | | | 1/16 |
| 31 | Lignite reaction product | | | | | | | 3/16 |
| 32 | Settled tar | 8 | 13.5 | 19 | 33 | 45 | 111 | 5.5 |
| 33 | Hardwood oil | 8.5 | 12.5 | 22.5 | 43 | 63.5 | 107 | |
| 34 | Hardwood pitch | | | | | | | 1/16 |
| 35 | Hardwood oil top | 9 | 12.5 | 19.5 | 35 | 52 | 83 | 5.75 |
| 36 | Hardwood oil residue | 6 | 9.75 | 18.5 | 36 | 53 | 70.5 | |
| 37 | Wood tar | | | | | | | 1/16 |
| 38 | Blend of wood tar and wood oil | 6.5 | 9.5 | 15 | 35.5 | | | 5.125 |
| 39 | Wood oil | 7.75 | 11 | 17.5 | 34 | 49 | | 6 1/16 |
| 40 | Soluble tar | 6.5 | 9.75 | 17 | 33 | 49 | | 7.125 |
| 41 | Demethanolized liquor, NH₄ | 0.5 | 1 | 1.75 | 3 | 4.25 | 5.5 | 8.5 |
| 42 | Demethanolized liquor | 10 | 16 | 28 | 60 | 130 | 250 | 5 3/16 |
| 43 | Rerun acid, NH₄ | 1 | 1.5 | 2.5 | 5 | 7.5 | 10.5 | 8.5 |
| 44 | Rerun acid | 12 | 16 | 22 | 38 | 85 | | 5 |

When a soft wood as pine is destructively distilled, the fractions obtained are similar to those obtained in the destructive distillation of hard wood and, accordingly, are similarly named. Whether hard or soft wood is used as the feed stock, the initial distillation produces a pyroligneous liquor which is divided into two fractions, a settled tar and a water-soluble layer sometimes termed the pyroligneous acid. These separate fractions may then be further fractionated as shown in the diagram with reference of the treatment of hard wood. The cuts made from the settled tar are normally termed the pitch and the heavy and light oils, while the cuts from the pyroligneous acid are termed either the wood oils or alcohol oils and the soluble tar. See, for example, U.S. 2,223,299 to K. G. Chesley. Where it is desired to specify that the feed stock was either hard wood or pine, then the specific fraction may be further described by specifying hard wood, pine or soft wood, as the case may be. In Example 16, the material used was the potassium salt of the settled tar obtained by the destructive distillation of pine, while in Example 17 the fraction used was the potassium salt of the pyroligneous acid fraction obtained from the destructive distillation of pine. The fractions used for Examples 7 through 14, 18 through 25 and 32 through 44 were all obtained by fractionating hard wood.

The amount of the alkali reaction product of the fractions of the pyroligneous liquor to be used in a drilling mud is not critical. The additives show definite thinning abilities at concentrations of as low as about ½ lb. per barrel. The maximum concentration of the products which may be used is generally limited only by commercial practice. Further, the maximum amounts used substantially no hydration is permitted so that conventional thinners are, therefore, unnecessary. When the alkalized pyroligneous liquor fraction is added to a drilling fluid containing pre-hydrated bentonite, the fraction thins or disperses the bentonite at low concentrations, but at greater concentrations causes flocculation.

In addition to their efficiency as thinners, the alkalized pyroligneous liquor fractions demonstrate substantially improved inhibition of bentonitic clays. This is shown both by the substantially enhanced water loss as compared to the other materials, and, even more clearly, by the rapidity with which a clay-free layer appears in the drilling muds. Where the products of the invention are used as the primary dispersants, this property means that virtually no additional clays are being added to the mud other than those produced from the drilling itself, i.e., the shales, however bentonitic they may be, are sufficiently inhibited to substantially reduce their tendency to break off from the sides of the hole and add to the mud volume, and, also, the clay cuttings carried up from the hole by the drilling fluid and not removed by the shaker screen will separate easily and almost completely while the mud is passing through the settling pit. As a result, upon recirculation to the hole, only the drilling mud itself will enter the hole, the undesirable clay solids falling to the bottom of the settling pit. As the undesirable clays entering the system will be limited largely to those cuttings produced by the bit, the mud volume under normal drilling conditions will not increase sufficiently to cause any significant adverse increase in the level of the pit. If extremely difficult formations are encountered and/or the drilling is sufficiently prolonged and deep enough so that the volume rises to an undesirably high level, the excess may be easily removed by a simple jetting of the mud solids from the bottom of the pit.

While it is apparent that the properties of the alkali salts of the pyroligneous liquor fractions herein described are eminently suitable for use in drilling muds, it is also apparent that the outstanding ability of these materials to inhibit the hydration of bentonitic shales eminently suits them for use in a wide variety of applications. Thus, in the secondary recovery of oil by water flooding of the strata, the presence of hydratable shale imposes considerable problems and difficulties on a successful and efficient flooding operation. The sluffing and swelling of the shales due to hydration interferes with the flow of water through the strata and thus considerably reduces the efficiency of the operation. By adding the alkali salts of the instant invention to the water used in the flooding operation, the hydration of the shales is substantially prevented with consequent improvement in the efficiency of the operation.

The terms used to define the various products obtained by destructive distillation of wood are well known in the art. Reference is made to the following texts:

Bunbury, "The Destructive Distillation of Wood," pages 104 and 105;

Hawley, "Wood Distillation," pages 64–69; and

Klar, "The Technology of Wood Distillation," pages 60–69.

What is claimed is:

1. A water-base fluid useful in oil well drilling comprising: water, a water-loss control agent and the reaction product obtained by reacting (a) a member selected from the group consisting of alkali metal alkali and ammonia alkali with (b) an organic fraction of the pyroligneous liquor obtained from the destructive distillation of ligneous material, said fraction selected from the group consisting of pyroligneous acid from hardwood, settled tar from hardwood, light oil from hardwood, soluble tar from hardwood, demethanolized liquor from hardwood, pyroligneous acid from softwood, soluble tar from softwood, light oil from softwood and coal tar creosote, the amount of said selected alkali employed in forming said reaction product being sufficient to cause the reaction product to have a pH of at least about 7.0, the amount of said reaction product in said fluid being in the range of about one-half pound to about 25 pounds per barrel.

2. A fluid according to claim 1 wherein the organic fraction is coal tar creosote.

3. A fluid according to claim 1 wherein the ligneous material is softwood and wherein the fraction is pyroligneous acid.

4. A fluid according to claim 1 wherein the selected fraction is soluble tar from hardwood.

5. A fluid according to claim 1 wherein the selected fraction is settled tar from hardwood.

6. A fluid according to claim 1 wherein the alkali is selected from the group consisting of potassium hydroxide and ammonia.

7. A fluid in accordance with claim 6 wherein ligneous material is hardwood and the fraction is selected from the group consisting of soluble tar and settled tar.

8. In a process for drilling a well wherein an aqueous drilling mud is circulated through the well, the improvement which comprises adding to said mud the reaction product obtained by reacting (a) a member selected from the group consisting of alkali metal alkali and ammonia alkali with (b) an organic fraction of the pyroligneous liquor obtained from the destructive distillation of ligneous material, said fraction selected from the group consisting of pyroligneous acid from hardwood, settled tar from hardwood, light oil from hardwood, soluble tar from hardwood, demethanolized liquor from hardwood, pyroligneous acid from softwood, soluble tar from softwood, light oil from softwood and coal tar creosote, the amount of said selected alkali employed in forming said reaction product being sufficient to cause the reaction product to have a pH of at least 7.0, the amount of said reaction product in said mud being in the range of about one-half pound to about 25 pounds per barrel.

9. A process according to claim 8 wherein the alkali is selected from the group consisting of potassium hydroxide and ammonia.

10. A process according to claim 8 wherein the organic fraction is coal tar creosote.

11. A process according to claim 8 wherein the ligneous material is soft wood and the fraction is pyroligneous acid.

12. A process according to claim 8 wherein the selected fraction is soluble tar from hardwood.

13. A process according to claim 8 wherein the selected fraction is settled tar from hardwood.

14. In a process for secondary recovery of oil by water-flooding, the improvement comprising adding to the water used in said flooding operation the reaction product obtained by reacting (a) a member selected from the group consisting of alkali metal alkali and ammonia alkali with (b) an organic fraction of the pyroligneous liquor obtained from the destructive distillation of ligneous material, said fraction selected from the group consisting of pyroligneous acid from hardwood, settled tar from hardwood, light oil from hardwood, soluble tar from hardwood, demethanolized liquor from hardwood, pyroligneous acid from softwood, soluble tar from softwood, light oil from softwood and coal tar creosote, the amount of said selected alkali employed in forming said reaction product being sufficient to cause the reaction product to have a pH of at least about 7.0, the amount of said reaction product in said water being sufficient to inhibit the hydration of hydratable shales contacted thereby.

15. A process according to claim 14 wherein the alkali is selected from the group consisting of potassium hydroxide and ammonia.

16. A process according to claim 1 wherein the organic fraction is coal tar creosote.

17. A process according to claim 14 wherein the ligneous material is soft wood and the fraction is pyroligneous acid.

18. A process according to claim 14 wherein the selected fraction is soluble tar from hardwood.

19. A process according to claim 14 wherein the selected fraction is settled tar from hardwood.

References Cited

UNITED STATES PATENTS

| | | | |
|---|---|---|---|
| 1,572,510 | 2/1926 | Atkinson | 201—8 |
| 1,590,156 | 6/1926 | Ellis | 260—687 |
| 2,033,547 | 3/1936 | Ralston | 208—22 |
| 2,223,299 | 11/1940 | Chesley | 252—148 |
| 1,999,766 | 4/1935 | Lawton et al. | 252—8.5 |
| 2,109,858 | 3/1938 | Cannon | 252—8.5 |
| 2,515,207 | 7/1950 | Fisher | 252—8.5 |
| 2,782,859 | 2/1957 | Garst | 252—8.55 |
| 3,017,351 | 1/1962 | Scott et al. | 252—8.5 |
| 3,020,953 | 2/1962 | Zerweck et al. | 252—8.55 |

FOREIGN PATENTS

| | | |
|---|---|---|
| 896,144 | 5/1962 | Great Britain. |

OTHER REFERENCES

Hawley: Wood Distillation, pub. 1923 by Chemical Catalog Co. of New York, pp. 64 to 68.

HERBERT B. GUYNN, *Primary Examiner.*

U.S. Cl. X.R.

166—9; 208—2, 8; 252—8.55; 260—540, 541